July 21, 1953  W. L. GASKELL  2,646,089
JIG SAW
Filed April 30, 1947  2 Sheets-Sheet 1
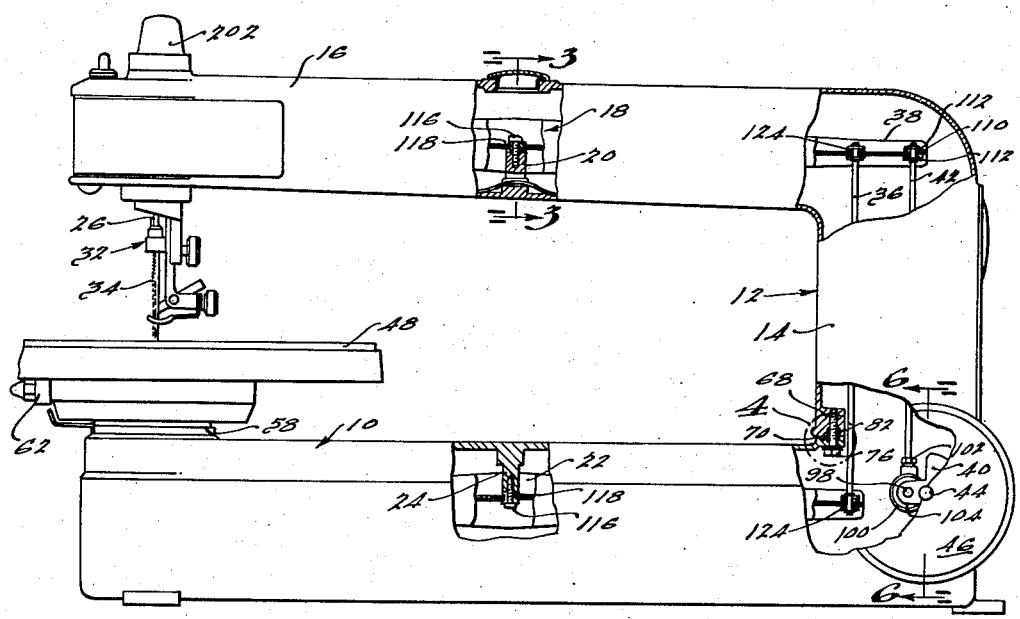
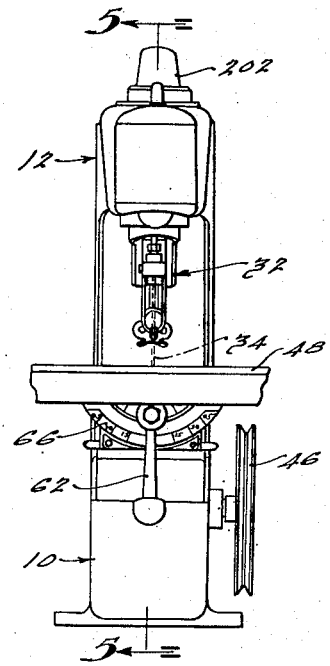
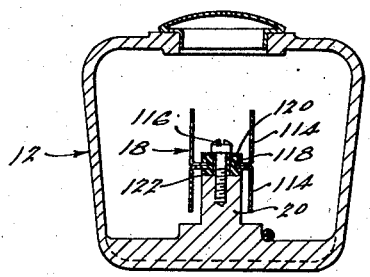
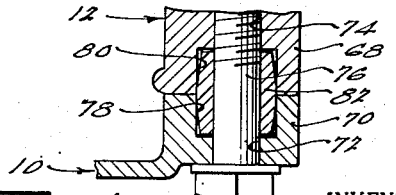
INVENTOR.
Walter L. Gaskell
BY
*Harness, Dickey & Pierce.*
ATTORNEYS.

July 21, 1953 W. L. GASKELL 2,646,089
JIG SAW
Filed April 30, 1947 2 Sheets-Sheet 2
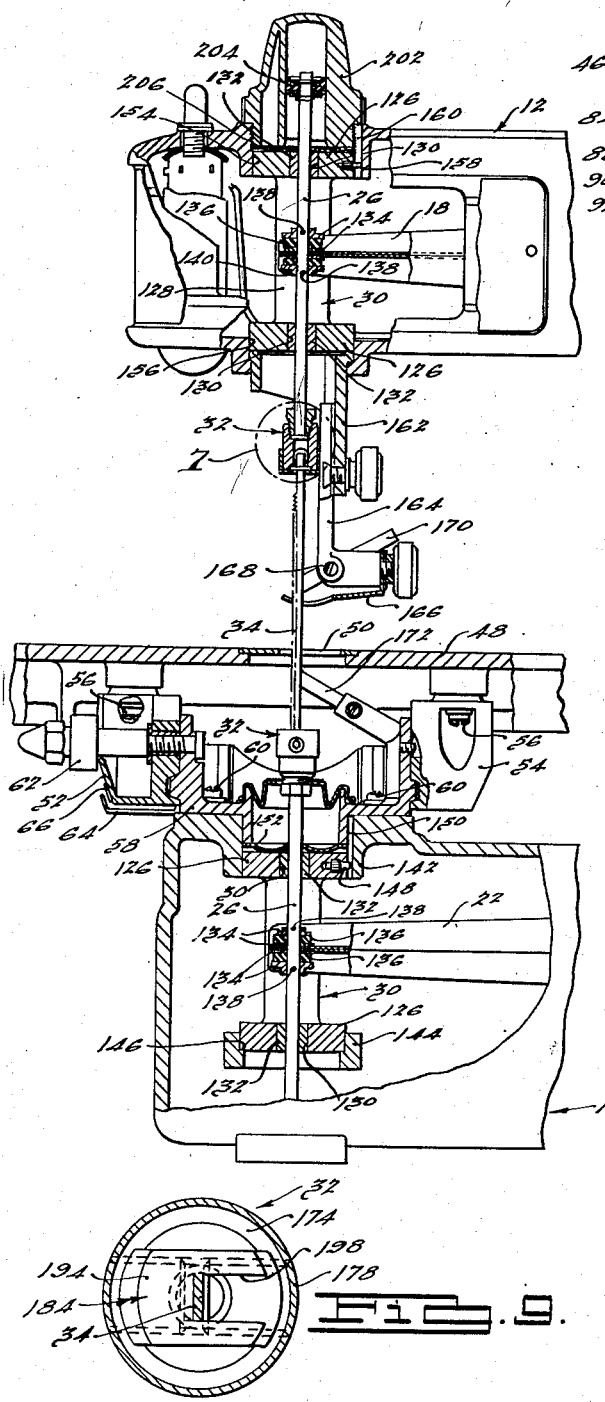
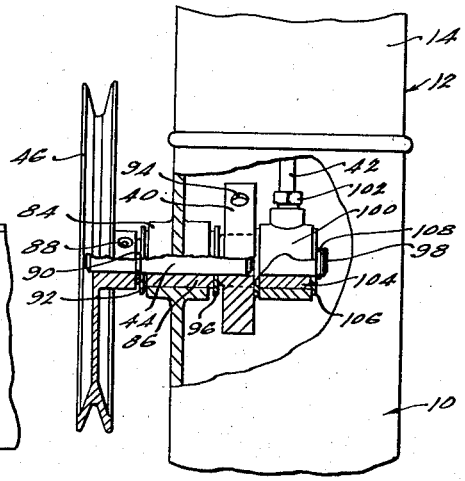
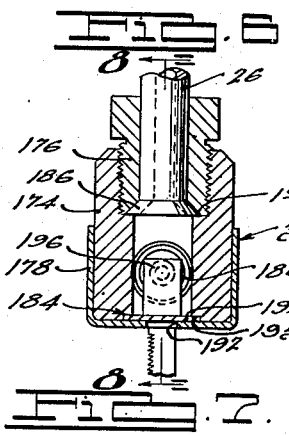
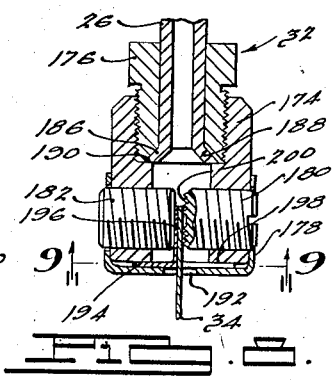
INVENTOR.
Walter L. Gaskell.
BY
Harness, Dickey & Pierce.
ATTORNEYS.

Patented July 21, 1953

2,646,089

UNITED STATES PATENT OFFICE 2,646,089

JIG SAW

Walter L. Gaskell, Ypsilanti, Mich., assignor to King-Seeley Corporation, Ann Arbor, Mich.

Application April 30, 1947, Serial No. 744,950

3 Claims. (Cl. 143—70)

This invention relates broadly to new and useful improvements in jig saws.

An important object of the invention is to provide a jig saw having walking beams which carry the saw blade.

Another object of the invention is to provide the walking beams with novel pivot supports which assure a relatively quiet and essentially frictionless operation.

Another object of the invention is to provide a novel means for tensioning the saw blade.

Still another object of the invention is to provide means for maintaining a substantially uniform tension on the saw blade at all times during operation of the machine.

Yet another object of the invention is to provide novel mountings for the walking beams which greatly reduce the destructive effect of inertia on the saw blade when the beams reverse their direction of travel.

A further object of the invention is to provide a novel chuck assembly for fastening the saw blade to the walking beams.

A still further object of the invention is to provide novel pull-rod assemblies for the chucks.

A yet further object of the invention is to provide a pull-rod assembly which is uniquely constructed to translate rocking movement of the walking beams to reciprocatory movement of the pull rods with maximum efficiency and minimum noise.

Another object of the invention is to provide a pull-rod assembly of the above-mentioned character which includes novel means for holding the saw blade against rotation and facing properly into the work at all times during operation of the machine.

Still another object of the invention is to provide a novel back-up or guide for the saw blade, which guide is capable of performing its intended function without causing portions of the blade to crystallize in the manner of metal guides conventionally used.

Yet another object of the invention is to provide novel means for blowing sawdust and the like away from the saw blade.

A further object of the invention is to provide a drive means for the walking beams which is associated therewith in such manner as to assure a smooth, noiseless, and efficient transfer of motion from the drive means to the walking beams.

A still further object of the invention is to provide a novel and improved mounting for fastening the arm portion to the base portion of the supporting framework.

Other objects and advantages of the invention will be apparent during the course of the following description.

In the drawing, forming a part of this specification and wherein like numerals are employed to designate like parts throughout the same, Fig. 1 is a side elevational view of a jig saw embodying the invention, parts thereof being broken away and shown in section for clearness of illustration;

Fig. 2 is a front elevational view of the saw;

Fig. 3 is an enlarged, vertical, transverse sectional view taken on the line 3—3 of Fig. 1;

Fig. 4 is an enlarged view of the portion of Fig. 1 enclosed in the circle 4;

Fig. 5 is an enlarged, fragmentary, vertical, longitudinal sectional view taken on the line 5—5 of Fig. 2;

Fig. 6 is an enlarged, fragmentary, vertical, transverse sectional view taken on the line 6—6 of Fig. 1;

Fig. 7 is an enlarged view of the portion of Fig. 5 enclosed in the circle 7;

Fig. 8 is a vertical, sectional view taken on the line 8—8 of Fig. 7; and

Fig. 9 is a transverse, horizontal sectional view taken on the line 9—9 of Fig. 8.

The main supporting frame of the jig saw shown in the drawing by way of illustration is made in two parts. One part is an elongated hollow base 10 and the other part is a generally L-shaped hollow arm 12, which is mounted on and fastened to the base. The downwardly extending portion 14 of the arm 12 fastens onto the rear of the base 10 and the horizontal portion 16 of the arm extends forwardly above and substantially parallel to the base.

A walking beam 18 in the horizontal arm portion 16 is rockably mounted on a fixed upstanding pivot support 20 (Fig. 1), and a corresponding walking beam 22 in the base 10 is rockably suspended from a fixed depending supporting pivot 24. Both walking beams 18 and 22 extend substantially the full length of the frame portions 16 and 10 in which they are mounted, and the forward ends thereof are attached to pull rods 26, which rods are mounted in and guided for vertical reciprocatory movement by supporting cages 30. On the proximate ends of pull rods 26 are chuck assemblies 32 which clamp opposite terminal portions of a saw blade 34.

As best shown in Fig. 1, the rearward ends of walking beams 18 and 22 are joined by a connecting rod 36 which extends vertically through the arm portion 14 and holds the attached ends of the beams in fixed spaced relation to tension the saw blade 34. Also, it will be observed that the upper walking beam 18 is formed with a rearward extension 38 which is connected to an eccentric drive 40 by a second connecting rod 42. This rod 42 is contained in the vertical arm portion 14 behind connecting rod 36. The eccentric drive 40 is carried by the inner end of a horizontal driving spindle 44 which is journaled for rotation in one side wall of the base 10. The outer end of driving spindle 44 carries a pulley 46 which is adapted to be driven by an electric motor or other suitable power source through an endless belt (not shown), according to conventional practice.

The jig saw is provided with a worktable 48 having a central opening 50 through which the saw blade 34 extends. This table 48 and its mounting are conventional and need not be described in detail; however, a general description is given in order that the operation and construction of the saw may be fully understood. As best shown in Fig. 5, the table 48 surmounts and is fastened to front and rear trunnions 52 and 54 by cap screws 56, and the trunnions are pivotally attached to a trunnion support 58 of conventional design. The latter is fastened solidly to the base 10 by machine screws 60 and the trunnions 52 and 54 are held in a selected adjusted position by a locking handle 62 in the conventional manner. When locking handle 62 is loosened, the table 48 can be adjusted to the desired angle, and the locking handle 62 can then be tightened to hold the table in the selected adjusted position. A pointer 64 fastened to and extending forwardly of the trunnion support 58 cooperates with a suitable scale 66 on the front trunnion 52 (Fig. 2) to indicate visibly the position of table 48.

In its general operation, the jig saw is similar to conventional machines of this type. Any suitable drive means capable of rotating pulley 46 within the range 500 to 1050 R. P. M. is satisfactory. Pulley 46 drives the eccentric 40 which, in turn, acts through connecting rod 42 to oscillate or rock walking beams 18 and 22 about their respective pivot supports 20 and 24. Manifestly, actuation of walking beams 18 and 22 in this manner effects a rapid up-and-down movement or reciprocation of the saw blade 34 in the usual manner.

In a device of this character, it is desirable that the frame be constructed in at least two parts in order to facilitate assembly of the working elements. Some vibration inevitably occurs during operation of the machine, and since it originates at or near the end of the arm 12, it has a marked tendency to loosen the fastening means which holds the several parts of the frame together. One feature of the present invention resides in the provision of novel means for fastening the arm 12 securely on the base 10.

As best shown in Figs. 1 and 4, the arm portion 14 is formed at the lower end thereof with an inwardly extending annular flange 68 which seats solidly on a correspondingly shaped annular flange 70 of the base 10. The latter flange 70 is provided with an annular series of holes 72 which register with correspondingly located internally threaded openings 74 in flange 68, and cap screws 76 extend upwardly through holes 72 into the threaded openings 74. In this connection, it should be observed that the bottom of base 10 is open so that access may be had to screws 76.

The free ends of the frame members frequently are jarred or otherwise moved out of alignment by handling and abuse during shipment or in use. For proper operation of the machine, the pull rods 26 must align accurately. Experience teaches, however, that the average home user of devices of this type does not take the time or trouble either to align the rods properly when the machine is first set up or assembled or to check the rods from time to time thereafter to see that they remain properly in alignment. According to the present invention provision is made for bringing and holding the two frame members into position to properly align the upper and lower pull rods 26. Moreover, this is accomplished automatically when the arm 12 is fastened on the base 10, thus relieving the user of responsibility and assuring proper operation of the machine at all times.

I have found that if holes 72 and openings 74 are provided with countersinks 78 and 80 respectively, which countersinks are arranged to open onto the interface between flanges 68 and 70 and small sleeves or bushings 82 are fitted snugly into the countersinks around cap screws 76, a superior and highly efficient fastening which is capable of withstanding continuous vibration for long periods of time is obtained. Preferably, the bushings 82 are tapered slightly from substantially the middle thereof as best shown in Fig. 4, and they preferably are pressed solidly against the walls of countersinks 78 and 80 when screws 76 are tightened.

By reason of the above construction, the sleeves or bushings 82 force the arm 12 into proper position on the base 10 when screws 76 are tightened. Also, bushings 82 relieve cap screws 76 of considerable strain, and the only function the latter need perform in the combination is to hold flanges 68 and 70 together.

For a specific and more detailed description of the eccentric drive, attention is directed to Fig. 6. As suggested, the driving spindle 44 extends through a boss 84 in one vertical wall of the base 10, and a bushing 86 in the boss supports the spindle for substantially frictionless rotation. The pulley 46 is fastened to drive shaft 44 by a set screw 88 and is separated from boss 84 by a snap ring 90 and washer 92. The eccentric 40 is fastened to the inwardly projecting terminal portion of drive shaft 44 by a set screw 94 and is separated from the inner end of bushing 86 by a washer 96. Eccentric 40 is here shown in the form of a crank arm fixed on the shaft 44 and carrying a driving pin 98. Opposite the crank arm, eccentric 40 is formed with a relatively large counterbalance mass which assures substantially vibrationless operation. Driving pin 98 carries an eccentric housing 100 which is fastened to the lower end of connecting rod 42 by a coupling 102. A bushing 104 mounted in eccentric housing 100 and journaled on pin 98 provides substantially frictionless rotation for the housing. Washer 106 and snap ring 108 hold the eccentric housing 100 and its bushing 104 removably associated with driving pin 98.

From the foregoing it will be readily apparent that rotary movement of driving pin 98 about the driving spindle 44 will act through connecting rod 42 to rock the walking beams 18 and 22 on their respective pivot supports 20 and 24. However, it also will be apparent that the lower end of connecting rod 42 not only moves up and down to reciprocate walking beams 18 and 22 but it also swings or oscillates back and forth due to the rotary path described by housing 100. The usual practice with this type of drive is to fasten the upper end of connecting rod 42 to the walking beam 18 by a suitable pin and bearing connection which transmits vertical movement of the connecting rod to the walking beam but merely rotates to accommodate oscillatory or swinging movement of the rod. However, this conventional type of connection requires frequent oiling to assure smooth operation and to prevent noise. Moreover, in a machine of this character such a connection wears relatively rapidly and may be the cause of considerable noise and vibration in operation.

Broadly, according to the present invention the connecting rod 42 is fastened to walking beam 18 by a flexible, resilient, nonmetallic connection which obviates all of the undesirable results attendant upon the conventional pin and bearing referred to above. The connection is here shown in the form of a grommet or bushing 110 which is fitted over the upper end of connecting rod 42 and in a suitable opening provided in the walking beam 18. Grommet 110 may be made of any suitable resilient material such as rubber or the like and it is fastened securely on the rod by snap rings 112. Also, it will be observed that the grommet 110 is formed with an annular peripheral groove and provides radially extending portions above and below the beam, which portions define cushions which bear against the beam and prevent the grommet from canting or wobbling in the beam opening. The inherently resilient grommet 110 yields or flexes to accommodate swinging or oscillatory movement of connecting rod 42 while simultaneously transmitting vertical movement to the walking beam 18. There are no parts to oil or lubricate and essentially noiseless operation is assured. Tests have shown this connection to be durable and efficient and in many ways far superior to the conventional pin and bearing connection.

Another feature of the invention resides in the manner in which walking beams 18 and 22 are formed and the manner in which they are mounted in the supporting frame. Except for the extension 38 the two walking beams 18 and 22 are identical. As best shown in Fig. 3, each beam comprises a pair of channel members 114 placed back to back and spot welded or otherwise fastened together. This construction assures a lightweight, essentially rigid unit which is pre-eminently suited for the intended purpose. When so constructed, the walking beams have low inertia in operation and relieve parts associated therewith and actuated thereby of considerable strain and stress.

According to the present invention, walking beams 18 and 22 are fastened to pivot supports 20 and 24 respectively by cap screws 116, which screws extend through grommets 118 of rubber or the like. These grommets 118 conveniently may be identical to the grommet 110 hereinabove described. Also, it will be readily apparent that the grommets 118 serve the same purpose as grommet 110 in so far as pivotal movement of the walking beams is concerned, since they yield to permit the beams to rock back and forth on their supports and there is no relative rotative movement between the parts during such action to cause noise or vibration in the machine. As shown in Fig. 3, washers 120 are interposed between the heads of cap screws 116 and grommets 118 so that the latter are compressed between pivot supports 20 and 24 and walking beams 18 and 22. In this manner, the ease with which walking beams 18 and 22 move on their pivots can be readily controlled. Uniform compression of the grommets 118 is assured by metal sleeves 122 which extend axially therethrough and limit the extent to which they can be compressed. Thus, grommets 118 will be uniformly compressed in all cases, and skilled workmen are not required to tension the rubber properly in order to obtain maximum efficiency of operation.

Connecting rod 36 also is fastened to walking beams 18 and 22 by grommets 124 which are identical to grommets 112. Also, grommets 124 are fastened to the walking beams 18 and 22 in the same manner as grommets 112.

In addition to providing essentially frictionless and relatively quiet operation, the above construction and arrangement of parts maintains a substantially uniform tension on the saw blade 34 at all times during operation of the machine and greatly mitigates the destructive effect on the blade of inertia which results when the walking beams reverse their direction of travel. The particular shape of grommets 118 and 124 provides pads or cushions above and below the middle webs of walking beams 18 and 22, and the walking beams normally are positioned so that the forward ends thereof must be pulled together slightly in order to fasten the saw blade 34 in place, so that the pads are compressed when the saw blade is inserted in the machine. As a result, the resilient action of the compressed pads acts through the walking beams 18 and 22 to maintain a substantially uniform tension on the saw blade 34. Also, there is a certain amount of resilience in the walking beams 18 and 22 which augment the action of the grommets.

The instant arrangement is particularly efficacious as compared with the conventional construction in jig saws of this type where the saw blade is tensioned by a spring or springs in such manner that the tension increases as the blade goes down and decreases as the blade goes up. This prior art or conventional construction creates rapid reversal of stresses in the blade which is conducive to early breakage.

In addition to the above, there are several features in the front-end construction of the machine which warrant special consideration. One such feature is the pull-rod assembly which was referred to briefly in the general description. Specifically, there is a separate pull-rod assembly associated with each walking beam 18 and 22, and since they are substantially identical in construction and operation, a detailed description of one will suffice.

Each pull-rod assembly includes a cage 30 which comprises a pair of vertically spaced disk-shaped headers 126 integrally connected at diametrically opposed sides thereof by integral vertical webs 128. The cage 30 is arranged vertically in the assembly and slidably supports the pull rod 26 which extends through central openings 130 in headers 126. Bushings 132 are provided in openings 130 around push rod 26 to provide an antifriction surface for the rod. As best shown in Fig. 5, push rod 26 also extends through the horizontal web of the walking beam with which it is associated, and, in order to hold the walking beam longitudinally fixed on the pull rod, washers 134 and pads 136 are fastened on the pull rod at opposite sides of the walking beam by cross pins 138. The pads 136 may be made of any suitably tough resilient material such as rubber or the like, and a pad is provided at each side of the walking beam. Washers 134 preferably are provided at opposite sides of each pad, and the entire assembly is fastened tightly together and against the walking beam by the cross pins 138. Preferably, the end of the walking beam is bifurcated to facilitate assembly of the pull rod therewith. The rubber pads 136 absorb the destructive effect of inertia on the saw blade 34 and by their resilient action convert rocking or oscillatory movement of the walking beam into direct reciprocatory movement of the pull rod.

One of the outer washers 134 is generally square in plan and formed with a hub portion 140 which interfits with the coacting cross pin 138 to prevent relative rotation between the washer and pull rod 26. The square washer 134 fits snugly between the side flanges of the walking beam and consequently engages the inner walls of the flanges to prevent rotation of the pull rod. In this manner, the saw blade 34 is prevented from rotating and held in proper association with the work at all times during operation of the machine.

The lower pull-rod assembly extends between a boss 142 at the top of the base 10 and a horizontal annular carrier support 144 which is an integral part of a transverse web (not shown) at or near the bottom of the base. As clearly shown in the drawing, the carrier 144 is formed with an annular seat 146 which supports the lower header 126. The upper header 126 is held rotatably fixed in boss 142 by a projecting pin 148 which enters a vertical guideway 150. Also, it will be observed that the upper header 126 is disposed below and in slight spaced relation with the trunnion support 58 and that an annular spring 152 confined between trunnion support 58 and upper header 126 acts against the latter to hold the lower header 126 solidly against seat 146.

The upper pull-rod assembly is similarly mounted in vertically spaced aligned openings 154 and 156 in the horizontal arm portion 16, and the upper header 126 is similarly provided with a radially projecting pin 158 which enters a vertical guideway 160 to hold the assembly against rotation. The lower header 126 seats downwardly against a swivel 162 having a swivel extension 164 which carries the usual hold-down foot 166. The swivel 162 and its appurtenances are conventional, and the swivel extension 164 is vertically adjustable to position the hold-down foot 166 properly with respect to the table 48. However, there is one element associated with the swivel assembly which is believed to be novel and a feature of this invention. Fastened to the swivel extension 164 by screw 168 is a saw guide 170 of Micarta which comprises superposed layers or laminations of fabric impregnated with a phenol resin or plastic. It will be observed that the saw guide 170 extends downwardly and forwardly from the screw 168, and the lower or forward end thereof is bifurcated to straddle or embrace at least a portion of the saw blade 34.

In practice, the bifurcation at the end of saw guide 170 may be formed by reversing the saw blade from the position shown in Fig. 5 and pressing the guide against the cutting edge of the blade so that the latter forms a groove therein. When the saw blade 34 is reversed and mounted as shown in the drawing, the saw cut fits over the rear marginal portion of the blade and holds the same steady during operation of the machine.

To my knowledge, saw guides have heretofore been made of metal, and rubbing between the blade and the guide causes the blade to crystallize and become brittle. I have discovered that this undesirable effect is substantially eliminated when a Micarta guide of the type hereinabove described is employed.

A second saw guide 172 identical with the upper guide 170 is provided immediately below the table 48.

Another feature of importance is the chuck assembly 32 which comprises a tubular chuck body 174 having a ferrule nut 176 threaded into one end thereof and a cap 178 over the other end. An adjusting nut 180 and a set screw 182 are threaded radially into the body 174 at diametrically opposed sides thereof and a chuck shoe 184 is provided in the lower end of the assembly between body 174 and cap 178. As best shown in Figs. 7 and 8, the pull rod 26 has a flared terminal portion 186 which fits into a correspondingly shaped annular recess in the lower end of nut 176 and seats against a radial shoulder 190 in the chuck body 174. When nut 176 is tightened, it holds the pull rod 26 fastened solidly in the chuck assembly.

The saw blade 34 extends into the chuck through an opening 192 in cap 178 to a position between screws 180 and 182. Also, it will be observed (Fig. 9) that the chuck shoe 184 has a horizontal base portion 194 which bridges the internal bore of the chuck body 174 and is nonrotatably received and guided for movement in a shallow groove 195 in the end face of body 174. A strip is cut and bent from one end of the base 194 to form an upstanding tongue 196 and to define a longitudinal medial slot 198 through which the saw blade extends into the body 174. As shown in Fig. 8, the upstanding tongue 196 is interposed between saw blade 34 and set screw 182, and the inner end of adjusting screw 180 is formed with suitable teeth or serrations 200 which bite into and grip the saw blade when the set screw is tightened. The outer portions of screws 180 and 182 extend through opening in cap 178 to hold the latter assembled on chuck body 174.

In operation, screw 180 is adjusted to position the saw blade 34 substantially centrally in the opening 192, and set screw 182 is tightened against the chuck shoe 184 to clamp the saw blade firmly in the chuck body 174. This arrangement provides a simple and highly efficient means for clamping the saw blade 34.

Heretofore, some difficulty has been encountered in that the chuck-holding member tends to fracture or break the saw blade when forced thereagainst with sufficient tightness to hold the same during operation of the saw. This undesirable effect is substantially entirely eliminated by the present construction. The teeth or serrations 200 bite into the saw blade to hold the same solidly in the chuck, but the screw 180 is not rotated after its initial adjustment so that the teeth 200 do not tend to tear or break the blade. Set screw 182 is rotated to clamp the saw blade 34 in the chuck, but the upstanding tongue portion 196 of the chuck shoe 184 serves as a buffer to prevent rotation of the screw from chewing or breaking the blade.

Still another feature of the invention resides in the provision of a cylinder 202 on the horizontal arm portion 16, which cylinder receives a piston 204 on the upper end of tubular pull rod 26 and pumps air under pressure down through the pull rod to the chuck 32 where it is discharged through opening 192 and along the saw blade 34 to blow away sawdust which accumulates around the saw-cut during operation of the machine. Cylinder 202 is open at the bottom only, and in operation, air is alternately sucked and discharged through the hollow pull rod 26 which thus performs a dual function in the combination of pull rod for the saw blade 34 and air passage for the pump 202, 204. In this connection it will be observed that the opening 192 in chuck 32 functions as a nozzle to direct the air downwardly and at both sides of the saw blade 34. Also, it will be observed that the cylinder 204 is threaded into the opening 154 and serves to maintain the upper header 26 in place by maintaining downward pressure thereagainst through the medium of an annular spring 206 interposed therebetween.

It is to be understood that the form of the invention herewith shown and described is to be taken as a preferred example of the same and that various changes in the size, shape and arrangement of parts may be resorted to without departing from the spirit of the invention or the scope of the appended claims.

Having thus described the invention, I claim:

1. In a jig saw having a frame, upper and lower walking beams generally horizontal and parallel to each other, rubber fulcrums securing intermediate points on the walking beams to the support so that distortion of the fulcrums permits rocking of the beams, a generally vertical link extending between the rear ends of the beams, rubber bodies flexibly securing the ends of the link to the beams, pull rods for the front ends of the beams, rubber bodies flexibly securing the pull rods to the beams, and means for rocking the beams on the fulcrums.

2. The invention set forth in claim 1 wherein said means comprises a rotary eccentric, a connecting rod drivably secured at one end to the eccentric, and a rubber body flexibly securing the other end of the rod to a beam.

3. The invention set forth in claim 2 wherein said eccentric is located on a level adjacent the lower beam and the rod extends vertically and is secured to the upper beam at a point to the rear of the link.

WALTER L. GASKELL.

References Cited in the file of this patent

UNITED STATES PATENTS

| Number | Name | Date |
|---|---|---|
| Re. 5,595 | Bushfield | Oct. 14, 1873 |
| 3,210 | Norcross | Aug. 4, 1843 |
| 74,497 | Camp | Feb. 18, 1868 |
| 105,120 | Ogden | July 5, 1870 |
| 161,583 | Williams | Mar. 30, 1875 |
| 168,019 | Hicks | Sept. 21, 1875 |
| 253,777 | Showalter | Feb. 14, 1882 |
| 836,376 | Francher | Nov. 20, 1906 |
| 891,993 | Hess | June 30, 1908 |
| 994,394 | Heidel | June 6, 1911 |
| 1,385,768 | Angle | July 26, 1921 |
| 1,881,777 | McPherson | Oct. 11, 1932 |
| 1,892,943 | Geyer | Jan. 3, 1933 |
| 2,033,846 | Mitchell | Mar. 10, 1936 |
| 2,074,976 | Beardsley | Mar. 23, 1937 |
| 2,076,034 | Lampman | Apr. 6, 1937 |
| 2,116,123 | Ocenasek | May 3, 1938 |
| 2,319,606 | Krautheim | May 18, 1943 |
| 2,407,236 | Heiney | Sept. 10, 1946 |
| 2,419,071 | Hall | Apr. 15, 1947 |
| 2,503,521 | Stover | Apr. 11, 1950 |